Jan. 19, 1943. W. J. CULBERTSON 2,308,492
MOTION CONVERSION MECHANISM
Filed Oct. 17, 1941 3 Sheets-Sheet 1
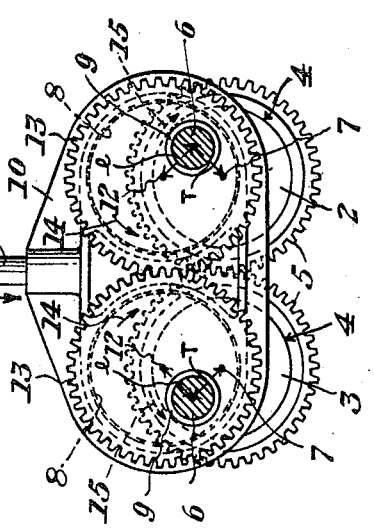
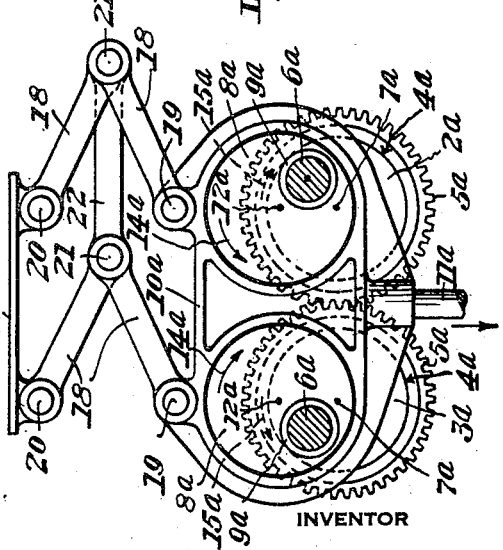
INVENTOR
William J. Culbertson

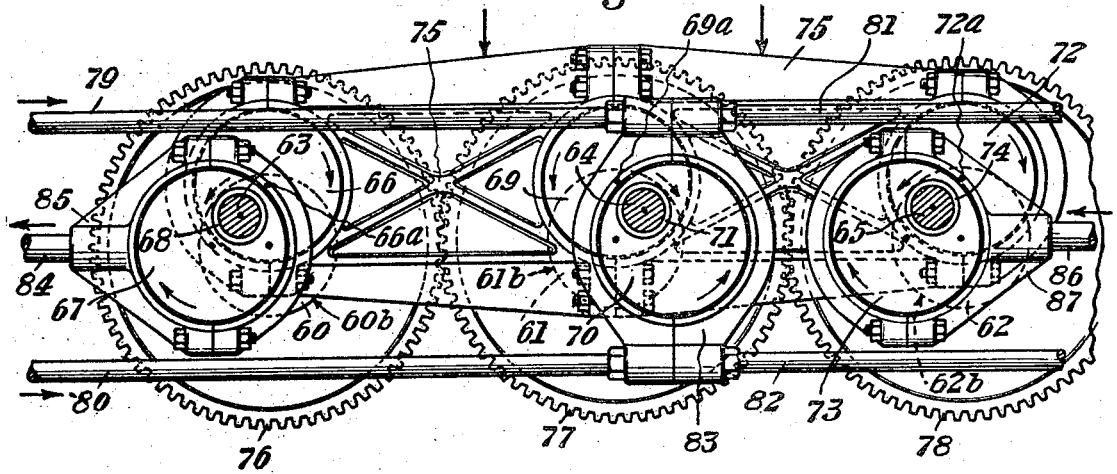
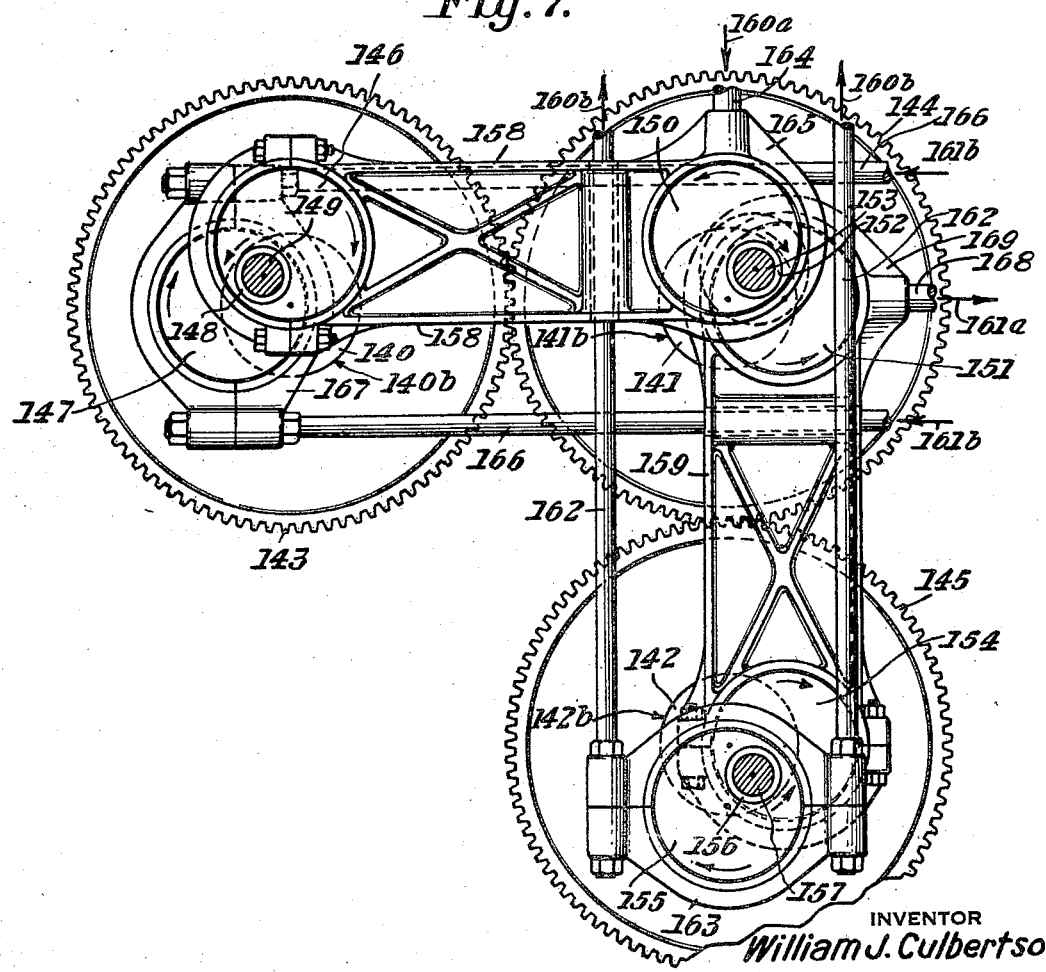

Jan. 19, 1943. W. J. CULBERTSON 2,308,492
MOTION CONVERSION MECHANISM
Filed Oct. 17, 1941 3 Sheets-Sheet 3

INVENTOR
William J. Culbertson

Patented Jan. 19, 1943

2,308,492

UNITED STATES PATENT OFFICE 2,308,492

MOTION CONVERSION MECHANISM

William J. Culbertson, Brocton, Ill.

Application October 17, 1941, Serial No. 415,383

10 Claims. (Cl. 74—49)

This invention relates to mechanisms for the conversion of the reciprocating motion of a piston in a cylinder or other type of back-and-forth, straight-line motion into rotary motion or the converse, and is intended to supplant the time honored, orthodox system of "connecting-rod-and-crank" drive, now in common use in engines, pumps, compressors and other machines.

A general object of this invention is the provision of simplified, improved means of connecting the pistons of a radial cylinder type, or of an opposed cylinder type, or of an opposed-piston, single or double-acting, opposed or tandem cylinder type engine, pump, compressor, etc., to the crankshaft.

A further object of this invention is the provision of a kind of driving gear mechanism, which makes possible the attainment of perfect balance and smooth running of all reciprocating and rotating parts of the complete engine throughout its entire speed range. Inasmuch as there are no parts of the drive mechanisms, having an oscillating angular or irregular motion, the "error" in the piston's position, due to the obliquity of the connecting rod of the usual orthodox type engine drive, is eliminated. All piston rods and other reciprocating members of this driving gear move with true harmonic motion.

The provision of thoroughly practical simplified driving gear mechanisms, such as those described herein, make possible the following improvements in an engine: Permits the installation of stuffing boxes on the piston rods, between the crankcase and the cylinders, thereby completely isolating the one from the other, thus insuring controlled cylinder wall lubrication; prevents pollution of the crankcase by leakage from piston liquid cooling equipment; makes possible the complete isolation of the cylinder wall heat from the crankcase; all made possible without requiring the use of a cross-head, which adds materially to the length or height of the engine. Permits elimination of all oscillating "hard to lubricate" wrist-pin bearing surfaces in the heated area directly under the piston head; simplifies the design of suitable apparatus for the liquid cooling of the piston head surfaces of large bore engines; permits reduction of the length of the piston, because of the elimination of all side thrust on said piston, to no more than is required for the piston to function as a ring carrier or interrupter, thus permitting the exposure of a large percentage of the heated cylinder wall surface, to the cooling effect of scavenging air, etc. Completely eliminates that part of the power lost through friction between the piston and cylinder wall surfaces, caused by the side thrust exerted on the ordinary trunk type piston, which is in common use. Obviates the necessity of employing widely separated crankshafts, connected by an idler gear train, or by a lay shaft and bevel gears, or by a silent chain, or by other means, now in common use in engines of the opposed-piston type; provides the first really simplified, practical driving gear for a double-acting, opposed-piston, co-axial cylinder type engine. Further objects and advantages will appear from the detailed description of the driving gear mechanisms, embodying the invention in the present preferred forms, submitted hereinafter, the description being considered in connection with the accompanying drawings.

These mechanisms are of the type in which eccentric sheaves are mounted upon the crank pins of a plurality of crankshafts, straps on the eccentric sheaves being connected, through piston rods or otherwise, to the reciprocating members, the throw of the cranks and eccentric sheaves all being made equal, one to another and the movement of the eccentric sheaves with respect to the crankshafts being so constrained that the center points of the eccentric sheaves, each move in straight-line paths, passing through the axis of crank rotation.

It has been known for many years that if the eccentric sheaves, including the sleeve upon which they are eccentrically mounted, are constrained in some positive manner, such as will force or require them to operate around the crank pin, in the opposite direction of rotation to, but with the same absolute angular velocity as, the crank, then the center points of the eccentric sheaves and of the eccentric straps rotatably mounted thereon will move with a reciprocatory, harmonic motion in a rectilinear path, which passes through the axis of crank rotation, the extent of this straight-line travel, back-and-forth across the crank axis, being equal to four times the throw of the crank.

Geometrically, this action or method of transformation of motion is explained by the fact that any point on the circumference of a smaller circle rolling on the inside of and tangent internally to a fixed circle of twice the diameter, describes a straight-line path, which passes through the center point of and is actually the diameter of the larger fixed circle; the extent, in any one direction, of this straight-line path, which, if the motion is continued, is of a reciprocating back-and-forth type, is equal to the diameter of the larger circle; the movement of this point on the circumference of the smaller circle around the center of the smaller circle being in the opposite direction of rotation from, but at the same absolute angular velocity as, the circular motion of the center of the smaller circle around the center of the larger circle. These geometric relations constitute a theorem, long established in mathematics, but never before successfully applied in a commercial, practical way, to the conversion of reciprocating motion to rotary motion as in steam engines, internal combustion engines, etc., or the converse as in plunger pumps, compressors, etc.

The mechanisms for the conversion of reciprocating motion into rotary motion and the converse, which are herein described, are intended mainly for use in connection with the opposed pistons of an opposed-piston type engine, pump, compressor, etc. Each of the mechanisms involves the use of a plurality of separate and distinct crankshafts, the axes of rotation of which are made parallel, each of the crankshafts being operatively geared, one to another, or otherwise connected, one to another, in such a manner that they all rotate in properly timed unison, at the same angular velocity, but with one or more of these crankshafts, operating in an opposite direction of rotation from that of the others in the group, the corresponding crankpins of each of these crankshafts being located in substantially the same plane normal to the axes of the crankshafts, the throws of all corresponding cranks of these crankshafts being made equal. The eccentric sheave or sheaves of an eccentric or eccentrics, together with a sleeve, to which they are rigidly attached or made integral with, are rotatably mounted on each of the corresponding crankpins of these crankshafts, the throw or eccentricity of these eccentric sheaves being made equal one to another and equal to the throw of the cranks, corresponding eccentrics of the different crankshafts being located substantially in the same plane, normal to the axes of the crankshafts. The eccentric strap of one of the eccentric sheaves mounted on a sleeve on the crank pin of one of these crankshafts is made integral with or rigidly connected, in a non-flexible manner, to the corresponding eccentric strap of one of the eccentrics on one or more of the other crankshafts in the group, at least one of which rotates in a direction opposite from that of the others so connected, thus forming a rigid connecting link member between these particular eccentric sheaves, which absolutely prevents relative movement between same, thus insuring a definite fixed relationship, one to another.

Means are preferably provided to constrain the movement of this rigid connecting link member to a reciprocating, parallel motion, wherein the center points of all eccentric sheaves so connected are forced to move in unison, at the same linear velocity, in the same direction, and in parallel, straight-line paths, which pass through the axes of crank rotation, the extent of this reciprocating travel in any one direction being equal to four times the throw of the cranks.

The piston rod or rods, which receive or deliver the thrust from or to the piston, or other member, depending upon whether the mechanism is used in a power generating or pumping engine, may be connected to the rigid reciprocating link member, mounted on two or more eccentric sheaves, or may be connected to the eccentric straps of other eccentric sheaves mounted on the same sleeves to which the rigid reciprocating link member eccentric sheaves are attached, but spaced in different angular positions around the axes of the crank pins, from those occupied by the eccentric sheaves of the rigid link member.

In the mechanism intended for use in transmitting the approximately equal thrusts of two opposed-pistons in an opposed-piston type engine, pump or compressor to the crankshafts, the two crankshafts are geared or otherwise connected to operate at the same angular velocity but in opposite directions, the one from the other. These crankshafts are mounted in parallel positions, side by side, each corresponding crank of both crankshafts being connected through eccentrics, piston rods, etc., to a different piston or set of uni-directional, co-axial pistons, said cranks being so positioned and connected that their crank pins reach a common extreme point of travel simultaneously, the throw of all cranks and eccentrics being made equal the eccentrics rotating at the same absolute angular velocity as, but in opposite direction from that of the crankshaft upon which each is mounted. Since the two sets of pistons operate in opposite direction, the thrust applied to one crankshaft will likewise be of opposite direction to that applied to the other crankshaft, although approximately equal in magnitude. In this particular type, the eccentrics to which the piston rods are attached, are spaced 180 degrees around the crank pin axis from the position of the eccentric sheaves on which the rigid reciprocating link member is mounted. In such an arrangement, the piston rod thrust transmitted through the paired eccentrics of one crankshaft to one end of the rigid reciprocating link member is approximately balanced by the approximately equal but opposite piston rod thrust transmitted through the paired eccentrics of the other crankshaft, to the opposite end of this reciprocating rigid link member.

The paired eccentrics, rigidly connected one to another, through the sleeves and spaced 180 degrees apart around the crank pin axes, may be looked upon as acting in the capacity of balanced levers with fulcrum point at the center of the crank pins, the piston rod load transmitted to one end of the lever being approximately balanced by the load from the other piston rods applied through the paired eccentrics on the other crankshaft, same being transmitted through the reciprocating link member to the opposite end of this so-called balanced lever. It is, therefore, only necessary to provide means for resisting and overcoming the difference in loading, of the two pistons, etc., in order to constrain the movement of the reciprocating link member to a motion parallel to itself, and thus insure the straight-line movement of the center points of all eccentrics.

In certain mechanisms wherein three or more crankshafts are employed, and the rigid reciprocating link member is mounted on the eccentric sheaves of three or more crankshafts, at least one of which rotates in a direction opposite to that of the others so connected, the effect of this difference in the applied loads is counteracted completely and the straight-line motion of all eccentrics insured through inherent characteristics of this type of link member, without the necessity of providing additional means.

It is to be understood that in all mechanisms herein described, reciprocatory movement may be transmitted to the eccentric strap or straps for conversion into rotary movement, as in the case of an internal combustion engine, a steam engine, etc., or rotary movement may be applied to the crankshaft for conversion into reciprocatory movement, as in the case of a plunger pump, a compressor, etc. It is to be further understood that the application and use of the mechanisms herein described is not confined to engines, compressors, pumps, etc., but may be used wherever it is desired to convert reciprocating movement into rotary movement and vice versa.

It is to be further understood that the crankshafts used in all mechanisms herein described and for which claims are made, may be of the "built-up" assembled type, permitting the use of solid one-piece sleeves, eccentric sheaves, etc., as illustrated in the various figures, or the crankshafts may be of the solid one-piece type, using split type, two-piece sleeves, eccentric sheaves, etc., on the crank pins.

In the accompanying drawings, which illustrate several embodiments of my invention:

Fig. 1 is a vertical transverse sectional view through two adjacent crankshafts illustrating one form of the invention;

Fig. 2 is a similar view illustrating another form of the invention;

Fig. 3 is a vertical transverse sectional view, partly broken away, illustrating another form of the invention, taken on the line III—III of Fig. 4, in which the drive gears 30 of Fig. 4 are shown in chain lines;

Fig. 4 is a longitudinal horizontal section taken substantially on the line IV—IV of Fig. 3, in which the eccentrics and cranks are shown in their extreme outer positions;

Fig. 5 is a vertical transverse section through three crankshafts and associated mechanisms illustrating another embodiment of the invention;

Fig. 7 is a vertical transverse section through three crankshafts and associated mechanisms illustrating another embodiment of the invention.

Figure 6:
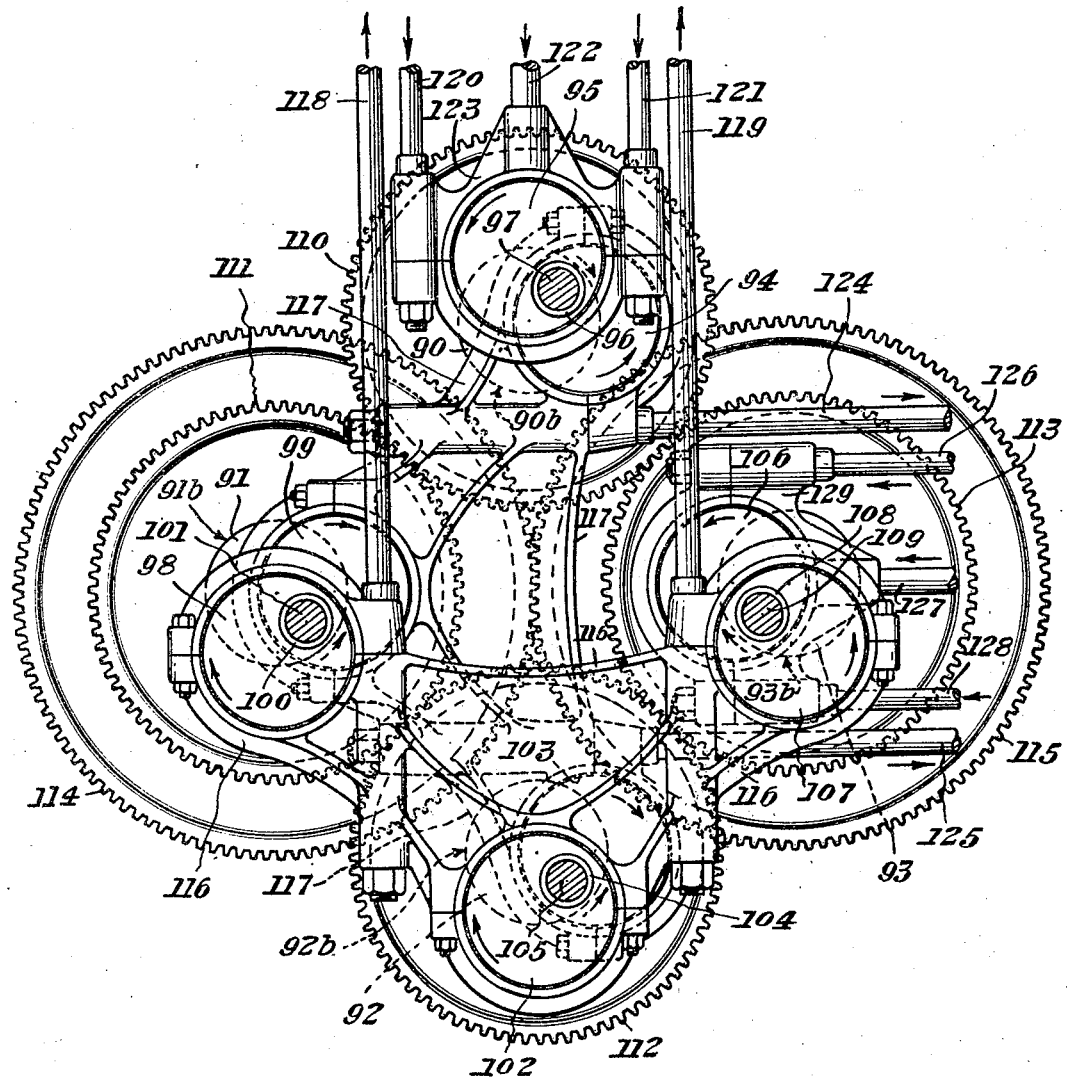
Fig. 6 is a vertical transverse section through four crankshafts and associated mechanisms illustrating another form of the invention.

Referring now more particularly to the accompanying drawings and for the present to Fig. 1, a plurality of crankshafts 2 and 3 are mounted in bearings 4 and the two crankshafts are geared together by gears 5, so that the two crankshafts rotate at the same angular velocity but in opposite directions. The corresponding crank pins 6 on each crankshaft are spaced around the axes 7 of their respective crankshafts and are geared together in such manner that both crank pins 6 rotate around their axes in properly timed relation one to another, so that both reach their corresponding top and bottom dead center points simultaneously, the throw T of both cranks being made equal, the corresponding crank pins 6 being located in substantially the same plane normal to the axes 7 of the crankshafts.

An eccentric sheave 8 integral with or rigidly fastened to a sleeve 9 is rotatably mounted on each of the corresponding crank pins 6 of the two crankshafts, the eccentricity e of the eccentric sheaves 8 being made equal one to another and equal to the throw of the cranks on which they are mounted, corresponding eccentric sheaves 8 being located in the same plane normal to the axes 7 of the crankshafts.

A rigid parallel eccentric link member 10 connects the two eccentric sheaves 8 in such manner as will permit the rotation of said eccentric sheaves within the rigid parallel eccentric link member, the rigid link member 10 maintaining both of the eccentric sheaves 8 in a definite constant relationship, the one with the other, the extent of movement of the eccentric link member 10 in any one direction being equal to four times the throw of the cranks. A piston rod 11 which receives or delivers the thrust from or to a piston, depending upon whether the mechanism is used in a power generating or pumping engine, is connected to the rigid parallel eccentric link member 10. Power is taken from or delivered to one or more of the crankshafts 2 or 3.

The eccentric sheaves 8, together with the sleeves 9, to which they are rigidly fastened or with which they are made integral, are caused to rotate around the crank pins 6 by the rotation of the crankshafts, the absolute angular velocity of these eccentric sheaves 8 and sleeves 9 being equal to but each rotating in the opposite direction from that of the particular crank pin 6 upon which they are mounted. Because of the fact that the eccentricity of the eccentric sheaves 8 is equal to the throw of the cranks, the center points 12 of the eccentric sheaves 8 move with a simple harmonic motion in straight-line paths passing through the axes 7 of the crankshafts, the extent of this reciprocating movement in any one direction being equal to four times the throw of the cranks.

In order to control the rotation of the eccentric sheaves 8 and sleeves 9, so that each sheave rotates at the same angular velocity as but in a direction opposite from the rotation of the crank pin on which it is mounted, it is necessary to provide means of constraining the movement of the rigid eccentric link member 10 in such manner that it will always maintain itself in parallel positions. In order to maintain the eccentric link member 10 parallel to itself in all positions of the cranks, eccentric gears 13 are made integral with or rigidly fastened to one or both sides of each eccentric sheave 8 on which the rigid parallel link member 10 is mounted. The gears 13 are meshed one with another in such manner that each eccentric sheave 8 rotates around its crank pin 6 in a direction opposite to that of the crank on which it is mounted, in properly timed relation one with another, so that both of the eccentric sheaves 8 and both of the crank pins 6 reach a common point of extreme travel simultaneously. The gears 13 are made concentric with the center points 12 of the eccentric sheaves 8 and the pitch diameter of each of the gears 13, which mate, are made equal. Since the crank pins 6 and eccentric sheaves 8 rotate in properly timed or synchronized relationship, one with the other, all reaching their top and bottom dead center points simultaneously, and since this relationship is positively maintained by gearing 5 and 13, the eccentric link member 10 will be maintained in parallel positions and the center points 12 of the eccentrics 8 will follow a straight-line path passing through the axes 7 of the crankshafts.

It has been stated that the eccentric sheaves 8 rotate about their crank pins 6 in a direction opposite to, but at the same absolute angular velocity as, the crank pins rotate about their axes. This will be clearly seen by the following: If a downward force is transmitted through the piston rod 11 onto the rigid link 10, it will tend to rotate the eccentric sheaves 8 about the crank pins 6 as indicated by the arrows 14, thereby producing a wedging action tending to spread the crank pins 6 apart. This causes rotation of the crank pins 6 in the direction indicated by the arrows 15. It will be noted that each eccentric sheave rotates in a direction opposite to the direction of rotation of the crank pin on which said eccentric sheave is mounted.

Referring now to Fig. 2, parts corresponding to those shown in Fig. 1 have been given the same reference numeral with the letter "a" suffixed. The device illustrated in Fig. 2 is substantially the same as that illustrated in Fig. 1, except that in Fig. 2 the rigid link member 10a is maintained in parallel positions by means of a linkage device instead of by means of the gears 13, as shown in Fig. 1. The arrangement of the cranks, crank pins, eccentric sheaves, gears, piston rod and all other parts with the exception of the parallel motion device is the same in the two embodiments. According to Fig. 2, in order to constrain the movement of the parallel eccentric link member 10a in such manner that it will always maintain itself in parallel positions and thereby insure the straight-line movement of the eccentric sheaves 8a, as previously explained and described for the mechanism illustrated in Fig. 1, a linkage system connecting the eccentric link member 10a to the crank case 17 is provided. This link system consists of two or more pairs of links 18, each pair consisting of two links of equal lengths, pin connected one with another, said link pairs connecting the rigid eccentric link member 10a at pivot connections 19 to pivots 20 fixed to the crankcase. The two or more pairs of links 18 are connected together at their center knuckle pin connections 21 with a parallel motion type link member 22 having a length equal to the distance between the fixed pivots 20, and likewise equal to that between the pivot connections 19 on the rigid eccentric link member 10a, said link system being in the form of two connected parallelograms. It is a well known geometric fact that a system of links, connected in this manner, will insure the parallel movement of any member, such as the rigid eccentric link member 10a, which is connected to the free ends of the link pairs 18, as described.

In the motion conversion mechanism illustrated in Figs. 3 and 4, a plurality of separate and distinct parallel built-up type single or multi-throw crankshafts 25 and 26 are supported by main bearings 27 and 28 mounted in a crankcase 29 and are operatively connected together by gears 30, so that the two crankshafts rotate at the same angular velocity but in opposite directions. Two eccentric sheaves 31 and 32 arranged at an angle of 180 degrees apart are fixed to a sleeve 33 rotatably mounted on a crank pin 34 which rotates about the axis 35 of the crankshaft 25. Two eccentric sheaves 36 and 37 are rigidly fixed to a sleeve 38 at an angle of 180 degrees to each other, the sleeve being rotatably mounted on a crank pin 39, which rotates about the axis 40 of the crankshaft 26. The paired eccentric sheaves 31, 32 and 36, 37 rotate at the same absolute angular velocity as but in the opposite direction of rotation from that of the crankshaft on which each pair are mounted. The eccentricity or throw e of each of the eccentric sheaves 31, 32, 36 and 37 with respect to the crank pin on which each is mounted is equal to the throw T of the crank pins and likewise equal to each other. The crank pins 34 and 39 are so synchronized and arranged that both of them and both of the eccentric sheaves 32 and 37 reach a common extreme point of travel simultaneously. A rigid parallel eccentric link member 41 is mounted on the two corresponding eccentric sheaves 32 and 37 in such manner that said eccentric sheaves may rotate within the rigid link member. A piston rod 42 of a co-axial opposed-piston type engine or pump is connected to a strap 43 which is rotatably mounted on the eccentric sheave 36. Two other piston rods 44 of the co-axial opposed-piston type engine are connected to a strap 45 rotatably mounted on the eccentric sheave 31.

The thrust loads, applied respectively to the piston rod 42 and to the two piston rods 44 taken together, are opposite co-axial forces, preferably approximately equal opposed forces. Thrust loads of this kind are present in opposed-piston type, single or double-acting engines, pumps and compressors, the line of application of these forces being perpendicular to the path of movement of the eccentric link member 41 and of the eccentric sheaves 32 and 37 on which it is mounted.

Assume that the force exerted on the piston rod 42 is exactly equal and opposite to the total forces exerted on the piston rods 44. Bearing in mind that the eccentric sheaves 36 and 37 are rigidly fastened to the same sleeve 38 on the crank pin 39, the two eccentric sheaves 36 and 37 may be considered as a lever arm having its fulcrum on the crank pin 39. The force applied to the piston rod 42 is transmitted through the eccentric strap 43 and tends to rotate the eccentric sheave 36 in the direction indicated by the arrow 46. It, therefore, tends to rotate the eccentric sheave 37 in the direction indicated by the arrow 47 and tends to move the rigid link member 41 to the left as indicated by the arrow 48. The force represented by the arrow 48 is counteracted and balanced in the following manner: The total force exerted on the piston rods 44 is transmitted through the eccentric sheave strap 45 to the eccentric sheave 31 tending to rotate it in the direction indicated by the arrow 49. It also tends to rotate the eccentric sheave 32 in the direction indicated by the arrow 50, thus tending to move the rigid link member 41 to the right, as indicated by the arrow 51. However, since the force exerted on the piston rod 42 is equal to, but in the opposite direction from that of the total force exerted on the piston rods 44, the forces represented by arrows 48 and 51 are likewise equal and opposite in direction and the rigid link member is thus prevented from moving either to the right or left, as viewed in Fig. 3. In view of this balance of the forces indicated by arrows 48 and 51 in the rigid link member 41, application of forces to the piston rods 42 and 44 accordingly rotates the crank pins 34 and 39 about their axes and the rigid link member 41 reciprocates in a straight-line path normal to the lines of application of the piston rod forces. This straight-line reciprocating motion of the rigid link member is indicated by the arrows 52. It is apparent, therefore, that under absolutely equal piston and frictional load conditions the rigid eccentric link member 41 will move parallel to itself in a straight-line path in a direction normal to the line of application of the piston rod forces. Under such theoretical conditions of operation, the straight-line movement of the rigid link member 41 would be assured without requiring the provision of any additional means. Under most conditions, however, such an exact balance of forces and resulting performance as described is not readily attainable and it is, therefore, desirable to provide means for constraining the movement of the eccentric link member 41 to the straight-line path and parallel motion required to insure the straight-line movement of the eccentric sheaves and piston rods.

The extent of the force, which must be applied through suitable apparatus to resist the displacement action exerted on the eccentric link member 41 as a result of unbalanced piston rod forces and thus constrain its movement to the desired straight-line parallel motion, is directly proportional to the difference between the co-axial opposed-piston forces which are impressed upon the mechanism. The difference between these opposed forces which must be resisted in the usual type of properly balanced opposed-piston engine or pump is comparatively small and the apparatus provided to counteract same may consequently be of comparatively light construction, the frictional losses in such apparatus being small, on account of the small forces involved.

In the embodiment illustrated in Figs. 3 and 4, this difference between the forces applied to the piston rods 42 and 44, which causes the unbalance of and the deviation in the movement of the link member 41 from the desired straight-line path, is counteracted by the provision of fixed or adjustable sliding shoes 53 made integral with or adjustably mounted on one or more of the eccentric straps 43 or 45 or on the rigid eccentric link member 41. If the shoes are placed on the straps 43 and 45 of the eccentric sheaves 36 and 31, as shown in the drawings, the sliding surfaces of the shoes should extend in a direction parallel to the line of movement of the eccentric sheaves 36 and 31. If the shoes are placed on the rigid link member 41, the sliding surfaces of the shoes should extend on lines parallel with the direction of movement of the link 41. The shoes operate in guides 54 mounted in the crankcase 29. It is preferred that either the shoes or the guides in which they operate be made adjustable to compensate for wear.

The gears 30 shown in Figs. 3 and 4 and the other corresponding gears shown in any of the other figures should be rigidly fastened to the crankshafts. However, one of every two such gears, meshed together and forming the operative connection between any two crankshafts, should be rigidly fastened to the crankshaft on which it is mounted, in such manner as will permit adjustment of said connection by a limited tangential movement of the gear teeth with respect to the crankshaft on which the particular gear is mounted. This adjustment is desirable for the purpose of correcting any possible misalignment in the line of movement of the eccentrics and piston rods resulting from gear tooth wear. The form of adjustable mounting used should be such as will insure a rigid non-slipping connection of the gear to the crankshaft under maximum load conditions and at the same time permit of the limited tangential movement as described. One manner of mounting and fastening a gear such as one of the gears 30 on the crankshaft 25 is shown in Fig. 4. In this particular type of adjustable gear mounting, the gear 30 is formed in the shape of a ring gear with its web bored out concentrically in the center portion, same being mounted and centered on a finished concentric shoulder 55 on the outer end of the crankshaft, the ring gear 30 being attached to the flanged outer portion 56 of the crankshaft by cap screws 57, the screw holes 58 through the web of the ring gear being slotted a sufficient amount to permit a limited tangential or angular movement of the ring gear with respect to the crankshaft.

In the embodiment illustrated in Fig. 3, the motion conversion mechanism comprises two crankshifts geared together and provided with eccentric sheaves, one eccentric sheave on each of the two crankshafts being rotatably mounted in a rigid link member. Two or more of the devices as shown in Fig. 3 may be combined so as to provide a combination including three or more crankshafts arranged, for example, in the form of an L or any other desired shape. In each case, however, the rigid link member such as the link member 41 of Fig. 3 is rotatably mounted on the eccentric sheaves of two crankshafts which rotate in opposite directions.

The motion conversion mechanism illustrated in Fig. 5 includes three crankshafts 60, 61 and 62, supported by main bearings 60b, 61b and 62b mounted in the crank case and having respectively crank pins 63, 64 and 65. Eccentric sheaves 66 and 67 are rigidly fastened to the same sleeve 68 rotatably mounted on the crank pin 63 and are arranged at an angle of 180 degrees with respect to each other. Eccentric sheaves 69 and 70 are rigidly fixed to a sleeve 71 rotatably mounted on the crank pin 64 and are likewise arranged at an angle of 180 degrees with respect to each other. Eccentric sheaves 72 and 73 are rigidly fixed to a sleeve 74 rotatably mounted on the crank pin 65, the eccentric sheaves 72 and 73 being at an angle of 180 degrees with respect to each other. A rigid link member 75 rotatably supports each of the eccentric sheaves 66, 69 and 72. The three cranks 60, 61 and 62 are geared together by gears 76, 77 and 78, in such manner that all cranks rotate at the same angular velocity but with at least one crank rotating in a direction opposite to that of the others, all crank pins 63, 64 and 65 of said crank shafts and eccentric sheaves 66, 69 and 72 reaching a common extreme point of travel simultaneously. The eccentricity or throw of each of the six eccentric sheaves is made equal one to another and equal to the throw of each of the three cranks and each of the eccentric sheaves rotate in a direction opposite from and with an absolute angular velocity equal to that of the respective crank pin on which it is mounted. Piston rods 79, 80, 81 and 82 are connected to an eccentric strap 83, in which the eccentric sheave 70 is rotatably mounted. Piston rod 84 is connected to an eccentric strap 85 in which eccentric sheave 67 is rotatably mounted. Piston rod 86 is connected to an eccentric strap 87, in which eccentric sheave 73 is rotatably mounted. The forces applied to or exerted by the piston rods 79, 80, 81 and 82 are opposed to the forces on piston rods 84 and 86.

In a mechanism of the type just described, in which the rigid connecting link member rotatably supports at least three eccentric sheaves, the difference between the applied opposed forces, which represents the unbalanced portion of the piston loads, is completely counteracted in and by the rigid parallel eccentric link member 75. An inherent characteristic of this type of link member is its ability to maintain itself in parallel, straight-line motion. In order to obtain this parallel motion, it is necessary that the rigid eccentric link member be mounted on and form a connection between corresponding eccentric sheaves located on the crank pins of three or more crankshafts, at least one of said crankshafts operating in a direction opposite to that of the others so connected. In this type of mechanism, it is not necessary to provide additional means to constrain the movement of the rigid link member 75.

The constraining action inherent in this type of link member may be explained as follows: Consider any instantaneous angular synchronized position of the crank pins as that shown in Fig. 5, such position being fixed for that particular instant of the crankshaft rotation. If this link member 75 formed a rigid connection between only two eccentric sheaves such as the sheaves 66 and 72 mounted on the crank pins 63 and 65 respectively, having crank throws in the same angular position, circular parallel movement of the link member 75 would be possible in either a clockwise or counterclockwise direction around the crank pin axes, the circular path of this movement being that followed by the center points 66a and 72a of eccentric sheaves 66 and 72 around the crank pins 63 and 65 on which they are mounted. The circular path of the center point 69a of the eccentric sheaves 69 mounted on the crank pin 64 of the middle crankshaft 61 is in a counter-direction from and cross-wise of that of the circular path of the center points 66a and 72a of the eccentric sheaves 66 and 72 on the crankshafts 63 and 65. Inclusion of this third eccentric sheave 69 in the rigid non-flexible, parallel link member 75, therefore, prevents any circular movement of the link member 75 around the axes of the crank pins, because of the diverse paths followed by the center points of these eccentric sheaves. The interference caused by this divergence in their different paths of movement combined with the rigid non-flexible type of link connection 75 prevents movement of said link in any manner other than parallel straight-line motion.

The motion conversion mechanism illustrated in Fig. 6 comprises four crankshafts 90, 91, 92 and 93 supported by main bearings 90b, 91b, 92b and 93b mounted in the crankcase and symmetrically located so as to form a four sided figure in the general shape of a square or diamond. Eccentric sheaves 94 and 95 are rigidly fixed to a sleeve 96 rotatably mounted on a crank pin 97. The eccentric sheaves 94 and 95 are arranged at an angle of 180 degrees to each other and the eccentricity or throw of each of the sheaves 94 and 95 is equal to the throw of the crankshaft 90. The eccentric sheaves 94 and 95 rotate at the same absolute angular velocity as but in the opposite direction from the rotation of the crank pin 97. Eccentric sheaves 98 and 99 are rigidly fixed to a sleeve 100 rotatably mounted on a crank pin 101, the sheaves 98 and 99 being spaced 180 degrees apart around the axis of the crank pin 101. The eccentric sheaves 98 and 99 rotate at the same absolute angular velocity as but in the opposite direction from the rotation of the crank pin 101. The eccentricity or throw of each of the eccentric sheaves 98 and 99 is equal to the throw of the crankshaft 91. Eccentric sheaves 102 and 103 are rigidly fixed at an angle of 180 degrees apart to a sleeve 104 rotatably mounted on a crank pin 105. The eccentricity or throw of each of the sheaves 102 and 103 is equal to the throw of the crankshaft 92. Each of the eccentric sheaves 102 and 103 rotates at the same absolute angular velocity as but in a direction opposite from the direction of rotation of the crank pin 105. Eccentric sheaves 106 and 107 are rigidly fixed to a sleeve 108 at an angle of 180 degrees apart, the sleeve 108 being rotatably mounted on a crank pin 109. The eccentricity or throw of each of the eccentric sheaves 106 and 107 is equal to the throw of the crankshaft 93. Each of the eccentric sheaves 106 and 107 rotate in a direction opposite from but at the same absolute angular velocity as the crank pin 109.

Crankshafts 90 and 91 are geared together by gears 110 and 111. Crankshafts 92 and 93 are geared together by gears 112 and 113. Crankshafts 91 and 93 are geared together by gears 114 and 115. All crankshafts rotate at the same angular velocity and the throws of all crankshafts are equal. The meshed pair of gears 110 and 111 are located in a different transverse plane from that of the meshed pair of gears 112 and 112 and do not engage with said gear pair 112 and 113 as might appear from the illustration, Fig. 6.

The device includes two rigid link members. One of these rigid link members 116 rotatably supports the three eccentric sheaves 98, 102 and 107 mounted respectively on the crank pins 101, 105 and 109. A second rigid link member 117 rotatably supports the three eccentric sheaves 94, 99 and 103 mounted respectively on crank pins 97, 101 and 105. Piston rods 118 and 119 are rigidly connected to the rigid link member 116. Piston rods 120, 121 and 122 are rigidly connected to a strap 123 rotatably mounted on the eccentric sheave 95. Piston rods 124 and 125 are rigidly connected to the rigid link member 117. Piston rods 126, 127 and 128 are rigidly connected to a strap 129 rotatably mounted on the eccentric sheave 106.

The mechanism is adapted to be used in connection with two sets of opposed forces transmitted in directions substantially at right angles to each other, one opposed force of each set of opposed forces being applied to different rigid link members, the other opposed force of such sets being applied to the corresponding eccentric sheaves not directly supported by a rigid link member.

It will be noted that, in the device illustrated in Fig. 6, one set of opposed forces transmitted through piston rods 118, 119, 120, 121 and 122 are applied generally along an axis or symmetrical to an axis of the square or diamond formed by the four crank shafts. Likewise the other set of opposed forces transmitted through the piston rods 124, 125, 126, 127 and 128 are applied generally along or symmetrically to an axis through the other two crankshafts. It will be noted further that the crank pins 101 and 105 both rotate in a counter-clockwise direction, whereas the crank pin 109 rotates in a clockwise direction. In other words, at least one of the three crank pins 101, 105 and 109 connected by the rigid link member 116 rotates in a direction opposite from that of the others. This arrangement has two advantages:—First, it insures the parallel motion of the rigid link member 116 without the necessity of providing any other means; and, secondly, it balances opposing forces in the link member in the manner hereinbefore described for other mechanisms. It will be noted further that the crank pins 101 and 105 rotate in a counter-clockwise direction, whereas the crank pin 97 rotates in a clockwise direction. Thus at least one of the three crank pins 97, 101 and 105 connected by the rigid link member 117 rotates in a direction opposite from that of the others. All of the crank pins 101, 105 and 109 and eccentric sheaves 98, 102 and 107 operatively connected by the rigid link member 116, reach a common extreme point of travel at the same time. In a similar manner, all of the crank pins 97, 101 and 105 and eccentric sheaves 94, 99 and 103 operatively connected by the rigid link member 117, reach a common extreme point of travel at the same time.

The embodiment illustrated in Fig. 6 provides a compact symmetrical arrangement of four crankshafts and associated mechanism, wherein all loads are applied symmetrically and any unbalanced forces are compensated in and by the rigid link members 116 and 117.

The motion conversion mechanism illustrated in Fig. 7 includes three crankshafts 140, 141, and 142 supported by main bearings 140b, 141b and 142b mounted in the crankcase and geared together by gears 143, 144 and 145 in such manner that the crankshafts 140 and 141 rotate in opposite directions and the crankshafts 141 and 142 rotate in opposite directions. All three crankshafts rotate at the same angular velocity. Eccentric sheaves 146 and 147 are rigidly fixed to a sleeve 148 rotatably mounted on a crank pin 149. Eccentric sheaves 150 and 151 are rigidly fixed to a sleeve 152 rotatably mounted on a crank pin 153. Eccentric sheaves 154 and 155 are rigidly fixed to a sleeve 156 rotatably mounted on a crank pin 157. Each of the pairs of eccentric sheaves 146—147, 150—151, and 154—155 are mounted on their respective sleeves at angles of about 180 degrees to each other. A rigid link member 158 is rotatably mounted on the eccentric sheaves 146 and 150. A second rigid link member 159 is rotatably mounted on the eccentric sheaves 151 and 154.

The mechanism is adapted to be used in connection with two sets of opposed forces transmitted in directions substantially at right angles to each other. One set of forces includes a force 160a and two forces 160b which oppose the force 160a. The other set of forces includes a force 161a and two forces 161b which oppose the force 161a. The forces 160b are transmitted through rods 162 to a strap 163 rotatably mounted on the eccentric sheave 155. The force 160a is transmitted through a rod 164 to a strap 165 connected with rigid link member 158 and rotatably mounted on eccentric sheave 150. The two forces 161b are transmitted through rods 166 to a strap 167 rotatably mounted on eccentric sheave 147. The force 161a is transmitted through a rod 168 to a strap 169 connected with rigid link member 159 and rotatably mounted on the eccentric sheave 151. It will be noted that when the motion conversion mechanism is used in an opposed-piston type engine, pump or compressor the force 160a opposes the forces 160b and that the force 161a opposes the forces 161b.

It will be noted that in the device shown, the three crankshafts 140, 141 and 142 are arranged to form substantially a right angle. The eccentricity of the eccentric sheaves and the throws of the crankshafts are all made equal, one to another. The rigid link member 158 is rotatably mounted on the pair of eccentric sheaves 146 and 150 which are rotatably mounted respectively on crank pins 149 and 153. These two crank pins rotate in opposite directions but at the same angular velocity. Furthermore, these two crank pins 149 and 153 are so synchronized that they together with eccentric sheaves 146 and 150 all arrive at a common dead center point simultaneously. In a similar manner, the rigid link member 159 is rotatably mounted on the pair of eccentric sheaves 151 and 154 which are rotatably mounted respectively on crank pins 153 and 157. These two crank pins rotate at equal angular velocities but in opposite directions and are so synchronized that they together with eccentric sheaves 151 and 154 all arrive at a common dead center point simultaneously.

It will be noted that in the motion conversion mechanism illustrated in Fig. 7, two sets of opposed forces are transmitted to a motion conversion mechanism including only three crankshafts. In the device illustrated in Fig. 6, two sets of opposed forces are transmitted to a mechanism including four crankshafts. In the mechanism shown in Figs. 6 and 7, piston rods may be connected directly to the rigid link members, thereby confining the total number of necessary eccentric sheaves per crank throw to the number of co-axial piston and cylinder groups connected to that particular crank throw. These arrangements make it possible to group a large number of closely spaced co-axial opposed-piston single or double-acting type cylinders in two or more perpendicular cylinder banks, all provided with pistons connected to the one motion conversion mechanism, thus permitting a very large concentration of engine power, at the same time making possible the use of relatively short crankshafts. A substantial reduction in the engine weight per horse power is thus made possible in this manner.

In all of the motion conversion mechanisms according to this invention, the torque available at the drive shaft is exactly double that of a simple "crank-and-connecting-rod" system of drive, having connecting rods assumed to be of infinite length and with crank throws and piston rod loads equal to those of the motion conversion mechanisms. In view of this fact, all of these mechanisms are best suited for use as driving gear in power producing engines, especially those types wherein the driving force required by pistons in the compression phase of the cycle is delivered direct to same, through rigid or articulated connecting rods, from pistons in the power phase of the cycle, without requiring the transmission of said compression forces through the crankshafts.

In all of the mechanisms, constraining the movement of any one of the eccentric sheaves of any one of the cranks effects the constraint of all other eccentrics in the mechanism which are interconnected by gears and rigid link members to the eccentric sheave which is directly constrained.

Eccentric sheaves additional to those described and shown may be mounted in different positions on the sleeves which are rotatably mounted on the crank pins of any one of the mechanisms but the effect of such additional eccentric sheaves is to increase the extent of the unbalanced forces which must be counteracted in the mechanism. An increase in these unbalanced forces results in increased frictional losses in the apparatus.

In any of these mechanisms, one or more of the gears interconnecting the crankshafts, such, for example, as one of the gears 30 of Fig. 4, may be made adjustable at its crankshaft fastening in the manner illustrated in Fig. 4 or may be made adjustable in any other desired manner for the purpose of correcting any possible misalignment in the line of movement of eccentrics and piston rods resulting from gear tooth wear.

In the particular form of built-up crankshaft shown in the different figures, the main crankshaft journals are actually circular shaped web members between adjacent crank throws, these web members being made concentric with the axis of the crankshaft and made sufficiently large to completely surround and include the crank pins in their side surfaces, the main bearing journal surfaces being the peripheral face portions of these circular webs. Such a design is made practicable by the fact that the throw of the crank, used in the driving gear mechanisms, is only one-half of that required in the usual connecting-rod-and-crank type of driving gear, having a total piston stroke equal to that of these drive gear mechanisms. It is, therefore, possible to employ this type of main crankshaft journal design in these mechanisms, without making it necessary to increase the diameter of these main bearings beyond practical limits or greatly in excess of that required for the usual connecting-rod-and-crank type of drive gear having an equivalent piston stroke, etc. Such a main bearing design makes possible a substantial reduction in the total length of the crankshaft, at the same time materially increasing both its strength and stiffness.

In all of the forms of these motion conversion mechanisms herein described, perfect balance of all operating parts may be obtained by first balancing the sleeve and the masses it carries, such as eccentric sheaves, about the axis of the crank pin and then balancing the whole assembly of sleeve, eccentric sheaves, crank pins, crank webs and unbalanced reciprocating forces, said balancing being accomplished by the proper attachment of suitable masses in the form of counterweights, to the crankshafts and to the reciprocating members.

On account of the back-lash present, to a greater or lesser degree, in all gear drives, there is a slight side-play present in all pistons which are directly and rigidly connected by relatively short piston rods to the eccentrics, of mechanisms herein described; this side-play being caused by the slight mis-alignment of the path of the eccentric movement, resulting from the relative movement, back-lash, of the mating gear teeth, one tooth within the other. The extent of this side-play of the piston rod is in proportion to the amount of the operating clearance provided between the mating gear teeth, and varies in its effect from zero, when the piston rod is at mid-stroke, to a maximum, when the piston rod is at either end of the stroke.

In view of these conditions, it is sometimes desirable to provide an articulated type of connection between pistons and eccentrics, which are to be directly connected by relatively short piston rods, one to the other, in all mechanisms wherein roughly finished or poorly fitted gears are used. In the case of co-axial opposed cylinder engines with gears of such type, the pistons may be connected directly to each other, through a common eccentric on the centrally located crankshaft, by a master-rod and articulated link type of connection. In the event only one piston is to be directly connected to the eccentric of such an engine, an articulated link type of connection may be used. In all such cases, a jointed connection, (wrist pin), should be provided between the piston rods and the pistons.

In all mechanisms wherein closely fitted, highly accurate and finished gearing is employed, such as the kind of gears used in the best aircraft engines, the extent of this "back-lash" and resulting mis-alignment and side-play of the pistons, piston rods, etc., is negligible and may be disregarded. Under such conditions, the rigid piston rod type of connection between piston rod and eccentric strap and between piston rod and piston may be used, without detrimental effect or increase in frictional losses. The usual clearance provided between the pistons and cylinder walls should be sufficient to "take-up" the negligible side-play present under such conditions, thereby relieving the pistons of any possible side thrust resulting from same.

Although I have illustrated and described certain preferred embodiments of the invention, it is to be understood that the invention is not so limited but may be otherwise embodied or practiced within the scope of the following claims.

I claim:

1. Motion conversion mechanism, comprising two crankshafts supported by bearings and geared together to rotate in opposite directions but at the same angular velocity, a crank pin on a crank of each crankshaft, an eccentric sheave rotatably mounted on each crank pin, the eccentricity of each eccentric sheave and the throw of each crank all being equal, the movement of the two crankshafts being so synchronized that both crank pins reach a common dead center point simultaneously, and a rigid link member in which both of said eccentric sheaves are rotatably mounted.

2. Motion conversion mechanism, comprising two crankshafts supported by bearings and geared to rotate in opposite directions but at the same angular velocity, a crank pin on a crank of each crankshaft, an eccentric sheave rotatably mounted on each crank pin, the eccentricity of each eccentric sheave and the throw of each crank all being equal, the movement of the two crankshafts being so synchronized that both crank pins reach a common dead center point simultaneously, a rigid link member in which both of said eccentric sheaves are rotatably mounted, and means for constraining said rigid link member to a movement whereby it is maintained parallel to itself in all positions.

3. Motion conversion mechanism, comprising two crankshafts supported by bearings and geared to rotate in opposite directions but at the same angular velocity, a crank pin on a crank of each crankshaft, an eccentric sheave rotatably mounted on each crank pin, the eccentricity of each eccentric sheave and the throw of each crank all being equal, the movement of the two crankshafts being so synchronized that both crank pins reach a common dead center point simultaneously, a rigid link member in which both of said eccentric sheaves are rotatably mounted, and a gear rigidly fixed to, and concentric with the center point of, each of said eccentric sheaves, said gears being operatively connected to each other so as to rotate at the same angular velocity but in opposite directions, whereby said rigid link member is constrained to a movement parallel to itself in all positions.

4. Motion conversion mechanism, comprising two crankshafts supported by bearings and geared to rotate in opposite directions but at the same angular velocity, a crank pin on a crank of each crankshaft, an eccentric sheave rotatably mounted on each crank pin, the eccentricity of each eccentric sheave and the throw of each crank all being equal, the movement of the two crankshafts being so synchronized that both crank pins reach a common dead center point simultaneously, a rigid link member in which both of said eccentric sheaves are rotatably mounted, and a linkage mechanism for constraining said rigid link member to a movement whereby it is maintained parallel to itself in all positions.

5. Motion conversion mechanism, comprising two crankshafts supported by bearings and geared to rotate in opposite directions but at the same angular velocity, a crank pin on a crank of each crankshaft, a pair of eccentric sheaves rigidly connected together and rotatably mounted on each crank pin and spaced about 180 degrees apart on said crank pin, the eccentricity of each eccentric sheave and the throw of each crank all being equal, the movement of the two crankshafts being so synchronized that both crank pins reach a common dead center point simultaneously, a rigid link member in which one eccentric sheave of each pair of eccentric sheaves is rotatably mounted, and means for transmitting each one of two opposed forces to different eccentric sheaves which are not mounted in said rigid link member.

6. Motion conversion mechanism, comprising two crankshafts supported by bearings and geared to rotate in opposite directions but at the same angular velocity, a crank pin on a crank of each crankshaft, a pair of eccentric sheaves rigidly connected together and rotatably mounted on each crank pin and spaced about 180 degrees apart on said crank pin, the eccentricity of each eccentric sheave and the throw of each crank all being equal, the movement of the two crankshafts being so synchronized that both crank pins reach a common dead center point simultaneously, a rigid link member in which one eccentric sheave of each pair of eccentric sheaves is rotatably mounted, means for transmitting each one of two opposed forces to different eccentric sheaves which are not mounted in said rigid link member, and means for constraining said rigid link member to a movement whereby it is maintained parallel to itself in all positions.

7. Motion conversion mechanism, comprising two crankshafts supported by bearings and geared to rotate in opposite directions but at the same angular velocity, a crank pin on a crank of each crankshaft, a pair of eccentric sheaves rigidly connected together and rotatably mounted on each crank pin and spaced about 180 degrees apart on said crank pin, the eccentricity of each eccentric sheave and the throw of each crank all being equal, the movement of the two crankshafts being so synchronized that both crank pins reach a common dead center point simultaneously, a rigid link member in which one eccentric sheave of each pair of eccentric sheaves is rotatably mounted, means for transmitting each one of two opposed forces to different eccentric sheaves which are not mounted in said rigid link member, a fixed guide surface, and a sliding surface sliding thereon and operatively connected to at least one of said eccentric sheaves for maintaining straight-line motion of the center points of said eccentrics.

8. Motion conversion mechanism, comprising three crankshafts supported by bearings and operatively geared together and arranged to form substantially a right angle, a crank pin on a crank of each crankshaft, a pair of eccentric sheaves rigidly connected together and rotatably mounted on each crank pin and spaced about 180 degrees apart on said crank pin, the eccentricity of each eccentric sheave and the throw of each crank all being equal, two rigid link members each operatively mounted on the eccentric sheaves of a different pair of two pairs of crankshafts in which the two crank pins of each pair of crankshafts rotate at the same angular velocity but in opposite directions and the movement of each pair of crankshafts so synchronized that their crank pins reach a common dead center point simultaneously, and means for transmitting two sets of forces to said eccentric sheaves, one set of forces being at approximately right angles to the other set of forces, each set of forces including an opposed force, each force of each set of opposed forces being applied to different corresponding eccentric sheaves of the two pairs of eccentric sheaves connected by a rigid link member.

9. Motion conversion mechanism, comprising three crankshafts supported by bearings and geared in such manner that all rotate at the same angular velocity but with at least one of said crankshafts rotating in a direction opposite to that of the others, a crank pin on a crank of each crankshaft, a pair of eccentric sheaves rigidly connected together and rotatably mounted on each crank pin of at least two crankshafts which rotate in opposite directions, the eccentric sheaves of each pair being spaced about 180 degrees apart on said crank pins, at least one eccentric sheave being rotatably mounted on the crank pin of a third crankshaft, the eccentricity of each eccentric sheave and the throw of each crank all being equal, the movement of the three crankshafts being so synchronized that the three crank pins reach a common dead center point simultaneously, a rigid link member operatively mounted on one eccentric sheave of each of the three crankshafts, and means for transmitting each one of two opposed forces to different eccentric sheaves which are not mounted in said rigid link member and which are mounted on the crank pins of crankshafts which rotate in opposite directions.

10. Motion conversion mechanism, comprising four crankshafts supported by bearings and operatively geared together so that all rotate at the same angular velocity, the center line passing through two of the diagonally opposite crankshafts being at approximately a right angle to the center line passing through the other two diagonally opposite crankshafts, a crank pin on a crank of each crankshaft, a pair of eccentric sheaves rigidly connected together and rotatably mounted on each crank pin and spaced about 180 degrees apart on said crank pin, the eccentricity of each eccentric sheave and the throw of each crank all being equal, two rigid link members each operatively mounted on the eccentric sheaves of a different set of two sets of three crankshafts in which the movement of the three crankshafts of each set is so synchronized that their crank pins reach a common dead center point simultaneously, at least one crankshaft of each set of three crankshafts so linked together rotating in a direction opposite to that of the others in the set and means for transmitting two sets of forces to said eccentric sheaves, one set of forces being at approximately right angles to the other set of forces, each set of forces including an opposed force, one of the forces of each set of opposed forces being applied to a rigid link member, the other opposed force of this particular set of forces being applied to one eccentric sheave of a pair of eccentric sheaves not connected by this particular rigid link member to which the first named force is connected but which is connected by the other rigid link member of the mechanism.

WILLIAM J. CULBERTSON.